April 23, 1929.  C. S. BRAGG ET AL  1,709,834
BRAKE MECHANISM FOR AUTOMOTIVE VEHICLES
Filed Jan. 20, 1927   4 Sheets-Sheet 1
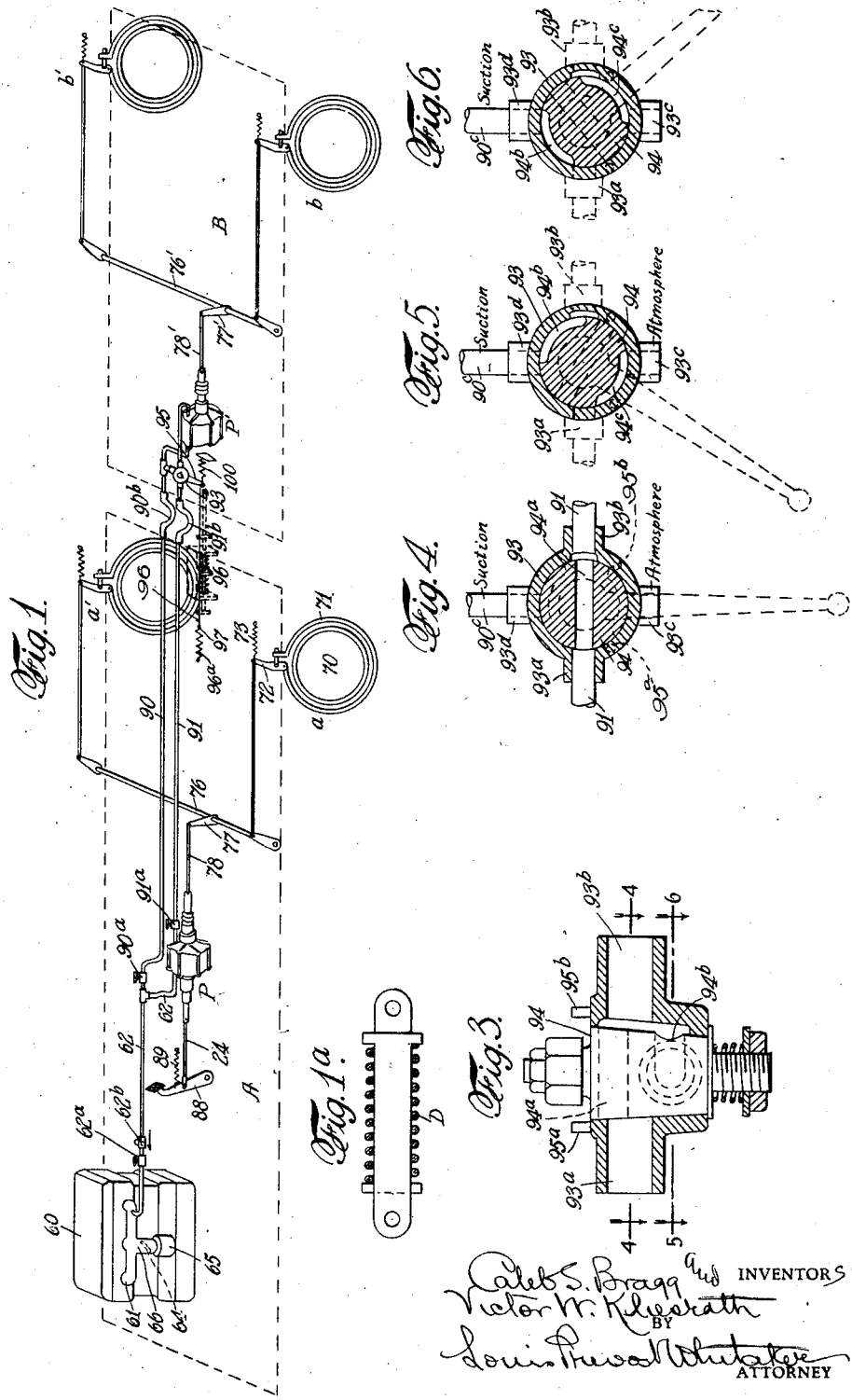

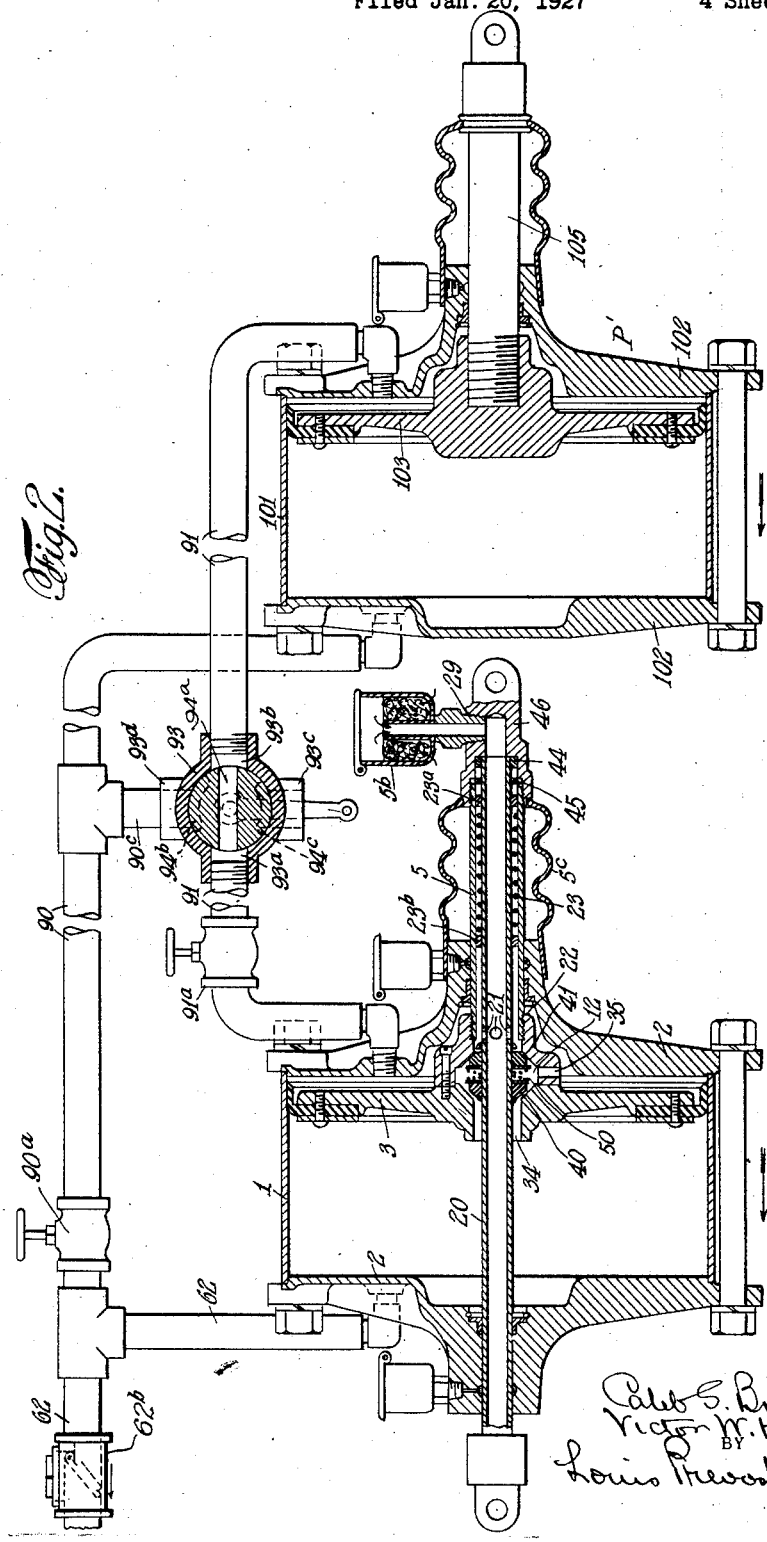

April 23, 1929.  C. S. BRAGG ET AL  1,709,834
BRAKE MECHANISM FOR AUTOMOTIVE VEHICLES
Filed Jan. 20, 1927  4 Sheets-Sheet 3
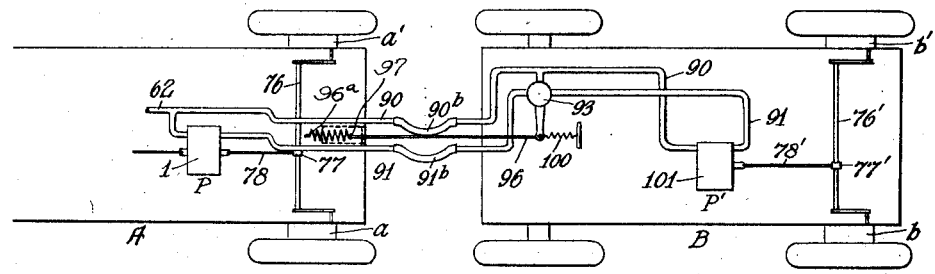
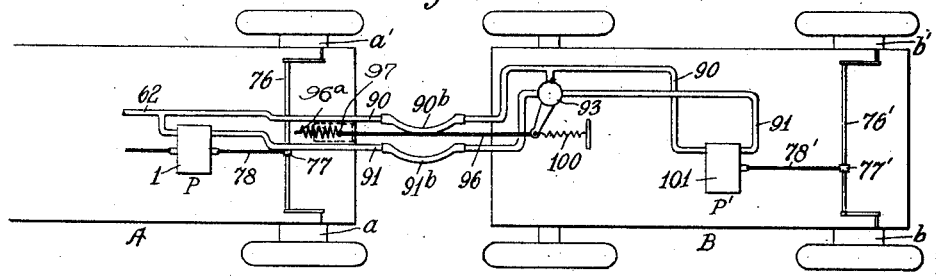
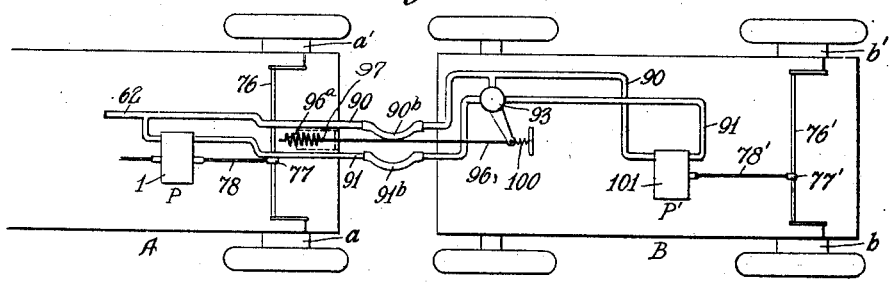
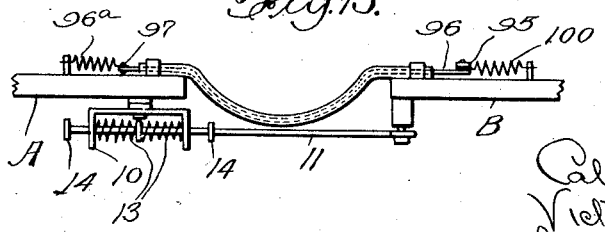
INVENTORS
Caleb S. Bragg
Victor W. Kliesrath
BY Louis Prevost Whitaker
ATTORNEY April 23, 1929.   C. S. BRAGG ET AL   1,709,834
BRAKE MECHANISM FOR AUTOMOTIVE VEHICLES
Filed Jan. 20, 1927   4 Sheets-Sheet 4
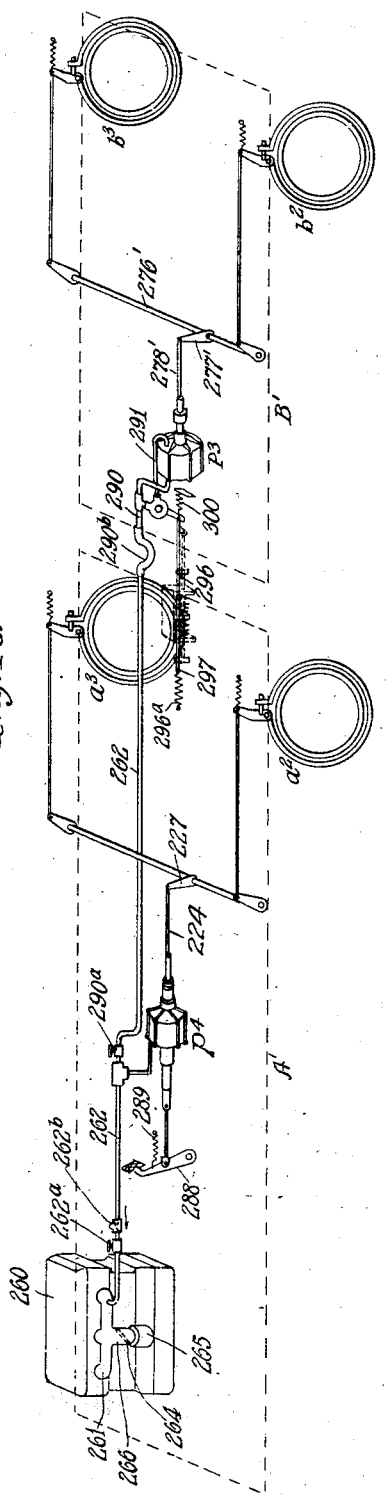
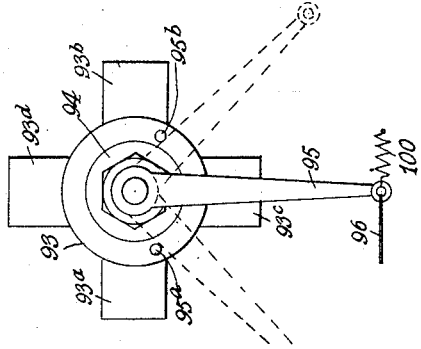
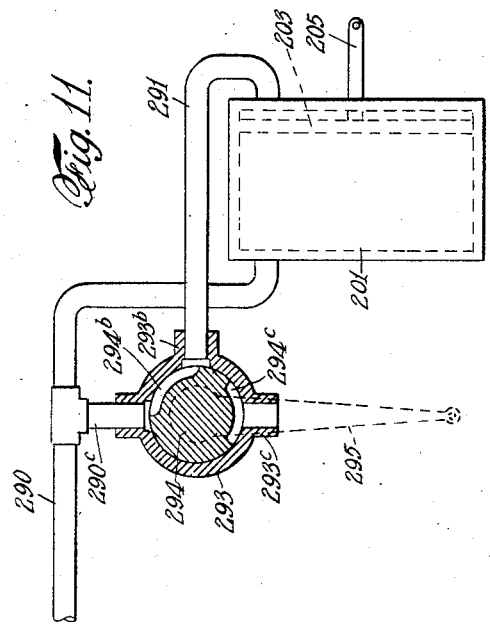

Patented Apr. 23, 1929.

1,709,834

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

BRAKE MECHANISM FOR AUTOMOTIVE VEHICLES.

Application filed January 20, 1927. Serial No. 162,232.

Our invention consists in the novel features hereinafter described, reference being had to the accompanying drawing which illustrates one form of our invention and a slight modification thereof, selected by us for purposes of illustration, and the said invention is fully disclosed in the following description and claims.

Our invention is an improvement in brake mechanism for automotive vehicles and is adapted particularly for use in connection with a main automotive vehicle, hereinafter referred to as the tractor, and a trailer, or trailers, propelled thereby. It is a common experience in the use of tractor and trailer, that the application of the brakes of the tractor causes the trailer to overrun the tractor, that is to say, to run up against it, and if the trailer is heavily loaded, its momentum not infrequently causes it to push against the rear end of the tractor with a force sufficient to cause the rear wheels of the tractor to skid or move laterally on the roadway. This produces the phenomenon known as "jack-knifing" and is a prolific source of serious accidents, especially on wet or slippery pavements. Where the tractor is provided with a main power actuator having controlling valve mechanism, and operated by differential pressures, preferably suction obtained by a connection with the intake manifold of the internal combustion engine which propels the vehicle, and air at atmospheric pressure for actuating the brake mechanism thereof, it has been proposed to provide the trailer, or trailers, with separate brake mechanisms operated by an auxiliary power actuator capable of being controlled by the valve mechanism of the main actuator carried by the tractor. In installations of this character, it has been found that where the trailer is heavily loaded and the brake mechanism is simultaneously applied to both vehicles, the trailer will frequently overrun the tractor and produce jack-knifing. It is also found that in such installations if the brakes of the trailer are sufficiently powerful to hold it when fully loaded, they act with too great effect upon the trailer when carrying a light load, or none at all. The trailer itself is usually much lighter than the tractor, and frequently weighs less than 25% of the load which it is capable of carrying, while the weight of the tractor is generally equal to, and in many cases greater than its normal load. It follows, therefore, that if the power brakes on the trailer and tractor are adequate to stop them when fully loaded, if both vehicles are empty and the brakes are applied simultaneously to both vehicles with sufficient power to make a normal stop of the tractor, the trailer will slow down more rapidly than the tractor, and may have its wheels locked by the brakes, in either case causing its wheels to skid and throw the rear end of the trailer sideways with respect to the roadway. This is particularly liable to happen on wet pavements and in any case is likely to result in a more or less serious accident. The tractor and trailer are ordinarily connected by coupling means which provide a certain amount of lost motion by springs or otherwise, and our present invention has for its object the utilization of the variations in the distance separating the tractor and trailer to effect the operation of a power actuator carried by the trailer, and operatively connected with the brake mechanism thereof so as to equalize the retardation of both vehicles. In the preferred form of our invention, in which the brake mechanism of the tractor is applied by means of a main actuator on the trailer, so that the actuators and the brake mechanism of the trailer by an auxiliary actuator are substantially simultaneously operated, these results are accomplished, and in addition the main and auxiliary actuators are normally maintained in operative connections for simultaneous action.

In carrying our invention into effect, we provide an auxiliary valve mechanism for the control of the auxiliary actuator, independently of the valve actuating mechanism of the main or master actuator, and the brake mechanism connected therewith, which auxiliary valve mechanism is actuated by changes in the relative distances at different times between the tractor and trailer within the limited lost motion provided in their coupling, whereby the running up of the trailer with respect to the tractor will apply the brakes of the trailer independently of the tractor, and when the coupling is stretched to or near its limit, will prevent the application of the brake mechanism of the trailer or relieve the brake mechanism thereof if it has been applied, to the end that the vehicles shall remain normally at the proper distance from each other and be retarded equally.

Referring to the accompanying drawings,

Fig. 1 is a diagram illustrating an installation of brake mechanism for a tractor and trailer and having our present invention embodied therein.

Fig. 1ª is a detail of one form of coupling which may be employed to connect the vehicles.

Fig. 2 is an enlarged view, partly in section, and partly broken away, showing the main and auxiliary actuators and their connections, and the auxiliary controlling valve mechanisms illustrated diagrammatically in Fig. 1.

Fig. 3 is a sectional view of one form of auxiliary valve mechanism which we find it convenient to employ in carrying out our invention.

Fig. 4 is a section on line 4—4 of Fig. 3, showing the valve in normal position.

Fig. 5 is a section on line 5—6 of Fig. 3, showing the position of the valve when the trailer lags.

Fig. 6 is a similar section showing the position of the valve when the trailer overruns the tractor.

Fig. 7 is a diagram illustrating the installation of Fig. 1, and showing the tractor and trailer spaced a normal distance apart, and showing the auxiliary controlling valve mechanism in its normal position.

Fig. 8 is a similar diagram showing the vehicles separated more than the normal distance and the auxiliary valve in position indicated in Fig. 5, in which the actuators are separated and the pressures on the opposite sides of the auxiliary piston equalized to relieve the brake mechanism if it has been applied, or prevent the application of the brake mechanism connected therewith.

Fig. 9 is a similar diagram showing the vehicles in closer than normal position caused by the running up of the trailer and the auxiliary valve mechanism in position to apply the trailer brakes with maximum force.

Fig. 10 is a diagram similar to Fig. 1, in which, however, the main and auxiliary actuators are not connected for joint operation, the auxiliary valve mechanism being provided with controlling valve mechanism operated by the relative positions of the vehicles.

Fig. 11 is a sectional view of the trailer actuator, and a slightly modified form of the auxiliary controlling valve mechanism illustrated in Fig. 10.

Fig. 12 is a rear elevation of the auxiliary valve mechanism showing the stops for limiting the movements of the valve operating arm.

Fig. 13 is a detail elevation showing a conventional form of coupling and Bowden wire connection for controlling the trailer actuator valve mechanism.

Referring to the embodiment of our invention illustrated in Figs. 1 to 9, inclusive, A, represents in the diagram, Fig. 1, a main automotive vehicle or tractor, represented by dotted lines, which may be, for example, a motor truck or the like. B, indicates in a similar manner, a trailing vehicle provided with two or more wheels. The tractor is provided with an internal combustion engine, indicated at 60, for propelling both vehicles, and the vehicles are coupled in any usual or preferred manner, which will provide a yielding action, and a certain amount of lost motion. The coupling itself has no bearing on our present invention, but for completeness of illustration, we have illustrated, in Fig. 1ª, a sectional view of one form of such a coupling, comprising in this instance two oppositely disposed T headed links, the contiguous portions of which are surrounded by a coil spring, D, which is compressed when the coupling is subjected to more than normal strain, permitting the links to move longitudinally with respect to each other, the longitudinal expansion of the coupling being limited in any usual or preferred way, for example, by bringing the coils of the spring together between the T heads of the links, or otherwise, to limit the extent of lost motion. A preferred conventional type of coupling is illustrated in Fig. 13, wherein the tractor A has pivotally secured to the underside thereof an inverted U-shaped cage 10 whose opposite legs are apertured to receive the coupling rod 11. This rod is slidably mounted in the legs of the cage and has secured thereto at an intermediate point between the legs of the cage, a collar 12 and surrounding said rod between the collar and each leg of the cage are compression springs 13. On the outside of the cage and spaced from the legs thereof are limiting stops 14 secured to the rod in any suitable manner. The opposite end of the rod is detachably and pivotally secured to the trailer B, as shown. We do not, however, limit ourselves to this type of coupling or any other particular type.

The engine, 60, is provided with the usual intake manifold, indicated at 61, suction passage, 66, leading thereto from the carburetor, 65, and provided with the usual throttle valve, 64. The tractor is also provided with suitable brake mechanism which may be of any desired type and constructed and arranged to apply the brakes to two or more wheels of the tractor. For purposes of illustration, we have shown in the diagram, Fig. 1, a diagrammatic representation of the brake mechanisms for the rear wheels of the tractor, indicated at $a$, $a'$, each of which comprises in this instance a brake drum, 70, brake band, 71, operating lever, 72, and retracting spring, 73, said brake levers being suitably connected to a rock shaft, 76, for joint operation. In this instance the tractor is shown provided with a main or master power actuator, indicated as a whole, at P, under the control of its valve mechanism, which is operated by a foot lever, 88, or other operator operated part, provided with the usual retracting spring, 89, means being preferably provided whereby the piston of the main or master actuator and the brake mechanism connected therewith may have applied to them the physical force of the operator through the lever, 88, in addition to the power of the actuator, or to operate the brakes of the tractor in case of failure of power.

The trailer, B, is also provided with independently operable brake mechanism of any usual or desired type for two or more of its wheels, and in this instance we have shown the trailer provided with two brake mechanisms for its rear wheels, indicated at $b$—$b'$, the said brake mechanisms being constructed identically with those previously described, and being connected by linkage to a rock shaft, 76', for joint operation, the parts of the trailer brake mechanism being given the same numerals as previously described, with the addition of a prime. The trailer brake mechanism is operatively connected with an auxiliary power actuator mounted on the trailer and indicated at P', and being in this instance a valveless actuator operatively connected with the main or master power actuator, P, and controlled by the valve mechanism of the latter through suitable pipe connections, hereinafter described.

The main or master power actuator as shown in Fig. 2, is of the type shown in our former Letters Patent of the United States, No. 1,583,117, granted May 4, 1926, and its specific construction is not claimed herein. As shown, it comprises the cylinder, 1, closed at its opposite ends, by heads, 2, and provided with a piston, 3, which is here shown as a single acting piston having a hollow piston rod, 5, communicating with the atmosphere at its outer end, by an aperture, 29, which is conveniently provided with an air strainer, $5^b$, the exposed portion of the piston rod being conveniently covered by a flexible and extensible corrugated cover member, $5^c$. The piston hub is shown as provided with a valve chamber, 12, communicating by the port, or ports, 35, with the cylinder in rear of the piston, and having a circular aperture, 34, at one end, communicating with the cylinder forward of the piston, and an aperture at the opposite end communicating with the air inlet aperture, 29, in any desired manner, or as hereinafter described. The valve chamber is provided with oppositely disposed seats and oppositely disposed valves, 40 and 41, of which the valve, 40, is the suction valve and controls the communication between the valve chamber and the passage, 34, while the valve, 41, is the air inlet valve and controls the communication between the valve chamber and the air inlet, 29. 20 represents a valve actuating sleeve which extends through the forward head of the cylinder, through the hub of the piston, through the valves, 40, 41, and preferably through the hollow piston rod, 5. The valves, 40 and 41, are preferably formed of molded rubber, or other suitable material, and fit the sleeve so as to make an air tight fitting thereon, and yet permit the sleeve to be moved longitudinally through the valve, and the valve sleeve is provided with collars for engaging the face of each valve and moving it in a direction to open the valve. The valves are normally seated by an intervening spring, 50, or other yielding means, which normally tends to press them toward their respective seats. The sleeve, 20, is preferably provided with apertures, 21, to facilitate the communication between the air inlet aperture, 29, and the valve chamber. In this instance the cylinder, 1, forward of the piston, is connected by a suction pipe, 62, with the intake manifold, 61, of the engine, said pipe being preferably provided with an adjustable restricting valve, $62^a$, to regulate the rapidity with which air withdrawn from the actuators may be delivered to prevent the possibility of stalling the engine if idling, or materially interfering with its operation, and said pipe, 62, is also preferably provided with a check valve, $62^b$, for the purpose of maintaining in the actuator cylinders, the maximum rarification which is obtained in the intake manifold between the operations of the actuators. It will be seen that the valve mechanism, including the sleeve, 20, moves with the piston, and is also capable of movement with respect to the piston for the purpose of actuating the valve mechanism, a movement of the sleeve in either direction serving to open one or the other of the valves. In this instance the sleeve, 20, is shown provided with a collar, 44, located in a recess in a fitting at the end of the piston rod, 5, between the end of the recess, and an inwardly extending collar, 45, on the piston rod. The piston rod, 5, is connected by a link, 78, with an operating arm, 77, on the rock shaft, 76, connected with the brake mechanism for the tractor, and the sleeve, 20, is connected by a link, 74, with a foot lever, 88. It follows from this construction, after the foot lever, 88, has been moved forward far enough to operate the valve mechanism, further movement of the foot lever will bring the collar, 44, of the sleeve, into engagement with the collar, 45, on the piston rod, and permit the operator to add his own physical force to that of the actuator, if the latter is operating, and to the brake mechanism connected therewith, or to move the piston and brake mechanism for the tractor connected therewith by his physical force alone in case of failure of power. This provision for limiting the lost motion between the valve actuating sleeve and the piston also protects the valve mechanism from injury.

The auxiliary actuator, P' is shown in Fig. 2, as a valveless actuator comprising a cylinder, 101, closed at its ends by heads, 102, having a single acting piston, 103, and piston rod, 105, which is connected by a link, 78' with an arm, 77', on the rock shaft, 76', connected with the brake mechanism for the trailer. The portions of the main and auxiliary actuator cylinders in rear of the pistons thereof are shown connected by a pipe, 91, and the auxiliary actuator cylinder, 101, forward of the piston, is connected by a pipe, 90, with the suction pipe, 62. The pipe, 90, is provided with a cut off valve, 90$^a$, and the pipe, 91, is provided with a similar cut off valve, 91$^a$, which may be closed when the trailer is not connected with the tractor, to permit the brakes of the tractor to be operated by the main or master actuator, P. The portions of the pipes, 90 and 91, which extend from the tractor to the trailer, will be provided with the usual flexible portions, 90$^b$ and 91$^b$, indicated in Fig. 1, to accommodate variations in the distances of the vehicles permitted by the lost motion in the coupling.

We prefer to maintain the pistons on both actuators normally submerged in vacuum, that is to say, that a condition of rarification existing in each cylinder on both sides of the piston therein. This is accomplished in the present instance by providing for the maintenance of the sleeve, 20, in such position, when the piston 3 is retracted, that the suction valve, 40, will be held open. To this end the actuating collar on the sleeve, 20, which engages the valve, 40, is so placed that when the sleeve, 20, is pushed rearwardly, by a retracting spring, as for example, the retracting spring, 89, of the foot lever, until the sleeve engages the end of the recess in the fitting, 46, at the outer end of the hollow piston rod, the suction valve, 40, will be held open, thus placing the portion of the cylinder in rear of the piston in communication with the portion of the cylinder forward of the piston, which is in direct communication with the suction pipe, 62, and exhausting the air from the cylinder on both sides of the piston. The air will also be exhausted from the auxiliary cylinder, 101, on both sides of the piston by means of the pipes, 91 and 90, when the main actuator piston, 3, is in its retracted position, as will be readily seen. In some instances we may provide a retracting spring, 23, interposed between collars on the exterior of the sleeve, 20, and interior of the piston respectively, indicated at 23$^a$ and 23$^b$, for normally holding the sleeve, 20, in its retracted position, and the valve, 40, open, and this spring may be employed in addition to the retracting spring, 89, of the foot lever.

In Figs. 1 to 6, inclusive, we have shown an auxiliary valve mechanism for controlling the auxiliary actuator independently of the valve mechanism of the main or master actuator and operable by variations in the distance between the vehicles permitted by the lost motion in the coupling for the purpose of preventing jack-knifing, or the skidding of the tractor, and to assist in maintaining the vehicles normally a distance apart, and also maintaining the main and auxiliary actuators in connection for joint operation under the control of the valve mechanism of the main actuator and the foot pedal controlling the same.

In the present instance the pipe, 91, is shown provided with a valve casing, 93, provided with oppositely disposed cylinder ports, 93$^a$ and 93$^b$, to which portions of the pipe, 91, are connected, placing said ports in communication respectively with the main and auxiliary cylinders in rear of the pistons therein. The valve casing, 93, is also provided with an air inlet port, 93$^c$, and a suction port, 93$^d$, the former communicating with the atmosphere, and the latter communicating by a branch pipe, 90$^c$, with the auxiliary suction pipe, 90. Within the valve casing is a suitable valve, in this instance a rotary valve, indicated at 94, which is provided with a through passage, indicated at 94$^a$, adapted to connect the cylinder ports, 93$^a$ and 93$^b$ when the valve is in its central or normal position, and the valve is also provided with recesses, indicated at 94$^b$ and 94$^c$, formed in portions thereof and out of communication with the through passage, 94$^a$. The rotary valve is shown provided with an operating arm, indicated at 95, for rotating the same. The normal position of the valve is indicated in Fig. 4. By rotating the valve in a clockwise direction, as indicated in Fig. 5, the recess, 94$^b$, may be brought into position to connect the cylinder port, 93$^b$, leading to the auxiliary actuator cylinder in rear of the piston with the suction port, 93$^d$, while the cylinder port, 93$^a$, is closed, thus cutting off communication between the actuator cylinders. This connects the auxiliary actuator cylinder on both sides of its piston with the source of suction, equalizing pressures therein if the auxiliary piston has been actuated to apply the brake mechanism of the trailer, permitting the brake mechanism to be retracted by the draft of the brakes, and the retracting springs therefor, and disconnects the auxiliary actuator from the main actuator so as to prevent any operation of the trailer brakes until the valve is returned to its normal position.

Fig. 6 shows the position of the valve, 94, when rotated in a counter-clockwise direction, which brings the recess, 94°, into position to connect the auxiliary actuator cylinder in rear of the piston directly with the atmosphere so as to apply the trailer brakes to the fullest extent, while the valve at the same time disconnects the auxiliary actuator from the main actuator which may or may not be in operation at the time, and in other words, secures a full application of the trailer brakes independently of the operation of the main actuator and the tractor brakes. As will be hereinafter seen, we provide means for operating this valve automatically so as to maintain it in normal position when the vehicles are at the normal or proper distance apart, to move it in the position shown in Fig. 5, when the trailer lags, and stretches the lost motion coupling between the vehicles for the purpose of releasing the trailer brakes if they have been applied and are retarding the trailer to too great an extent, and to move the valve into the position shown in Fig. 6, when the trailer overruns the tractor, to effect the application of the trailer brakes regardless of, or to a greater extent than the tractor brakes, and in either case to restore the vehicles to their proper relative positions, and the auxiliary valve mechanism to its normal position. In this instance we have shown an operating connection, indicated at 96, extending from the arm, 95, of the auxiliary valve mechanism, to a fixed point or connection, indicated at 97, on the tractor, the said fixed connection, 97, and the outer end of the arm, 95, being preferably located at points substantially coincident with the turning sense of the vehicle, so that the longitudinal force will not be exerted on this connection sufficient to operate the valve when the vehicles are making a turn. This connection may be of any desired character, as the link or coupling, but we prefer to use an ordinary Bowden wire and housing therefor as shown in Fig. 13. The valve operating arm, 95, is also provided with a retracting spring, indicated at 100.

We prefer to provide means for limiting the movements of the auxiliary valve, and this may be accomplished in any desired way. In the drawings, Figs. 3 and 12, we have shown the valve casing, 93, provided with stops, 95ª and 95ᵇ, on opposite sides of the valve operating arm, 95, for limiting the movement of the valve in opposite directions from its central or neutral position. In order to avoid undue straining on the arm, 95, or the connection, 96, when the arm, 95, is drawn forward to its fullest extent by the connection, 96, when the vehicles are separated more than the normal distance, we also prefer to insert in the connection, 96, a spring, 96ª, which will yield when the arm, 95, engages the stop, 95ª.

In Figs. 7, 8 and 9, we have illustrated, diagrammatically, the operation of the auxiliary valve mechanism when the vehicles are respectively (1) in normal position with respect to each other (Fig. 7); (2) when the trailer lags (Fig. 8); and (3) when the trailer overruns (Fig. 9). Assuming the vehicles to be moving along under the propulsion of the engine on the tractor, and at normal distances apart, the cylinders of both main and auxiliary actuators being exhausted on both sides of the pistons therein, if the operator desires to retard the forward movement of the vehicles, he will apply his foot to the foot lever, 88, moving the valve actuating sleeve of the main actuator forward, in the direction of the arrow in Fig. 2, permitting suction valve, 40, to close and open the air inlet valve, 41. This will admit air at atmospheric pressure in rear of the main actuator piston, and through the pipe, 91 (the auxiliary valve, 94, being in normal position) to the auxiliary actuator cylinder in rear of its piston, and will effect a substantially simultaneous actuation of the tractor and trailer brakes with equal pressures. As soon as the movement of the foot lever is stopped, a slight continued forward movement of the main actuator piston, 3, with respect to the sleeve, 20, effects the closing of the inlet valve 41, and holds the brakes applied. If the foot lever, 88, is slightly released, the sleeve, 20, will be moved rearwardly with respect to the piston, 3, opening the suction valve, 40, and permitting an equalization of pressures on opposite sides of both the main and auxiliary pistons and connecting both cylinders on both sides of the pistons therein, allowing the brakes to be instantly relieved by the draft of the brakes and their retracting springs, and they may be again applied by a forward movement of the foot lever sufficiently to again open the inlet valve, 41. This may be done as often as desired, as in continuous braking on long grades and in traffic. To simultaneously release both brake mechanisms the operator removes his foot from the pedal allowing the sleeve, 20, to be shifted rearwardly, opening the suction valve, 40, equalizing pressures on both sides of both pistons, and connecting them with the suction pipe, 62, to withdraw the air previously admitted, which is distributed under the control of the restricting valve, 62ª, to the intake manifold. This will be the normal operation so long as the vehicles maintain their normal relations with respect to each other.

Assuming, for example, that the trailer is not loaded, or is so lightly loaded that a normal application of the brakes to arrest the tractor will effect too great a braking action of the trailer brakes, the trailer would be retarded to a greater extent than the tractor, and lag to the extent permitted by the lost motion in the coupling, as illustrated for example, in Fig. 8. This will have the effect of moving the valve actuating arm, 95, forward through its connection with the Bowden wire, or other connection, 96, swinging the valve in a clockwise direction, into the position indicated in Fig. 5, disconnecting the actuators from each other, and connecting the cylinder of the auxiliary actuator in rear of its piston with the suction port, 93b, and the suction pipe, 62. As the auxiliary actuator cylinder forward of the piston is connected with the suction pipe by the pipe, 90, an immediate equalization of pressures takes place, and both ends of the auxiliary actuator cylinder are connected with the suction pipe, withdrawing the air previously admitted to apply the trailer brakes and permitting the brakes to be independently released. This will allow the trailer to move forward more rapidly than the tractor without interfering with the operation of the tractor brakes until the vehicles assume the normal relation to each other, indicated in Fig. 7, the valve, 94, being returned to normal position by its spring, 100, reconnecting the actuators, and again applying the trailer brakes, if the brake mechanism of the tractor remains applied, and this operation will be repeated as often as the trailer lags.

Assuming on the other hand that the trailer is, for example, very heavily loaded, so that when the brakes are applied to both vehicles, as hereinbefore described, the trailer is not retarded to the same extent as the tractor but overruns, or in other words, runs up on the tractor, as indicated in Fig. 9. This will relieve the connection, or Bowden wire, 96, and permit the retracting spring, 100, to swing the valve operating arm, 95, rearwardly into the position indicated in Fig. 6, which disconnects the actuators from each other by closing the portion of the pipe, 91, leading to the main actuator and connect the portion of the pipe leading to the auxiliary actuator in rear of its piston directly with the atmosphere, applying the trailer brakes with the maximum power, regardless of the extent to which the brakes have been applied on the tractor. This will prevent jack-knifing, and as soon as the trailer has been checked, so as to restore its distance from the tractor to the normal distance, the connection, 96, between the tractor and the auxiliary valve mechanism will restore the valve to the normal position shown in Fig. 4, and reconnect the actuators, so that pressures to the rear of the cylinders, will be equalized, and the release of the trailer brakes will occur simultaneously with the release of the tractor brakes, under the control of the foot lever, and the valve mechanism of the main actuator, as hereinbefore described. If the trailer runs up on the tractor, on a down grade, on account of its being heavily laden, or otherwise, the same result will be produced, and the trailer brakes will be automatically applied to check the trailer until it resumes its normal distance from the tractor, and as soon as it resumes its normal distance, the auxiliary controlling valve, 94, will be restored to its normal position, and the reconnection of the rear end of the auxiliary actuator cylinder with the rear end of the main actuator cylinder, in which rarification exists, will cause an equalization of pressures between the said portions of said cylinders, permitting an instantaneous release of the trailer brakes, and the withdrawal of the air previously admitted to actuate the trailer brakes, permitting them to return to their normal or off position.

It will be seen that by this arrangement, the operation of the auxiliary controlling valve mechanism for the auxiliary actuator is automatic, and by means of the connection between the tractor and the said valve mechanism, and the retracting spring, if the latter is employed, the valve will be operated so as to check any tendency of the trailer to overrun the tractor, by applying the trailer brakes independently of the tractor brakes, and to prevent the application of the trailer brake mechanism or to release them if they have been applied, in case of a lag of the trailer sufficient to bring the auxiliary valve mechanism into action, thus preventing the locking of the wheels of the trailer by the trailer brakes, if it is lightly loaded, and preventing the skidding of the trailer. Our invention thus tends to maintain the vehicles alway at the normal distance apart and the auxiliary valve mechanism in its intermediate or normal position.

In Figs. 10 and 11 we have illustrated diagrammatically a modified construction in which the trailer is provided with a power actuator for operating the brake mechanism of the trailer, said actuator being connected with the intake manifold of the engine on the tractor, and provided with valve mechanism automatically operated by variations in the relative positions of the vehicles, the brake mechanism of the tractor being controlled entirely independent of the brake mechanism of the trailer with or without the employment of a power actuator for the tractor brake mechanism. This construction enables us to secure many of the advantages previously described with the exception of a substantially simultaneous application of the brake mechanisms of the trailer and tractor under the control of the operator operated part which controls the tractor brake mechanism and is particularly applicable to cases in which the trailer is used in connection with an automotive vehicle not provided with power operated brake mechanism. In Fig. 10, for example, we have illustrated diagrammatically a tractor, A', and trailer, B', the tractor being provided with brake mechanism A² and A³, here represented in the same manner as in Fig. 1, the corresponding parts being here illustrated by the same numerals with the addition of 200 to avoid repetition. In this particular construction the foot pedal 288 is connected directly through the piston rod of the actuator P⁴ with the lever 227 by a rod 224. The foot pedal 288 is shown provided with the usual retracting spring 289 and the actuator P⁴ is similar in all respects to the actuator of Fig. 1, with the exception of course, that it has no connection by pipe or otherwise with the actuator on the trailer. Movement of the foot pedal 288 will actuate the valve mechanism of the actuator P⁴ and through its connections apply the brakes of the tractor but it will be understood that in this instance as in other forms, the operator may utilize his physical force to apply the brakes in addition to the power of the actuator or independent of the actuator should power fail.

In Fig. 10 the trailer, B', is shown provided with its own brake mechanism, for example, similar to that shown in Fig. 1, the corresponding parts being given the same numerals as in Fig. 1, with 200 added, and we have shown the trailer provided with a power actuator, indicated at P³, which may be constructed and operate precisely in the same manner as the actuator, P', illustrated in Figs. 1 and 2, and need not be further described. The piston of the actuator is connected by link, 278', with the arm, 277', on the rock shaft, 276', for operating the trailer brake mechanisms, here indicated at b² and b³. 262 represents a suction pipe which extends from the manifold, 261, of the internal combustion engine, 260, on the tractor supplied by the carburetor, 265, through the passage, 266, under the control of the usual throttle valve, 264. This suction pipe is provided with the restricting valve, 262ª, check valve, 262ᵇ, and cut off valve, 290ª, the latter being closed when the trailer is not used. The suction pipe, 262, extends to the rear of the tractor, and is connected by a flexible portion, 290ᵇ, with a continuation of the suction pipe, indicated at 290, which is connected with the actuator cylinder, 201, forward of the piston, 203, therein.

The auxiliary valve mechanism illustrated in Fig. 11, is of slightly modified construction, and in the form shown comprises a valve casing, 293, provided with a port, 293ᵇ, connected by a pipe, 291, with the actuator cylinder in rear of the piston. The valve casing is also provided with a suction port, 293ᵈ, connected by a pipe, 290ᶜ, with the suction pipe, 290, and the valve casing is also provided with an air inlet port, indicated at 293ᵉ. The valve, 294, in this instance a rotary valve, is not provided with any through passage, as previously described, but is provided with a peripheral recess, 294ᵇ, normally connecting the pipe, 291, with the suction pipe, 290ᶜ, and said valve is also provided with a recess, 294ᶜ, adapted, when the valve is counter-clockwise, to connect the pipe, 291, with the air inlet port, 293ᵉ, and disconnect the pipe, 291, from the suction pipe. The valve, 294, is provided with an operating arm, 295, which is connected by a suitable connection, as a Bowden wire, and housing, indicated at 296, with the tractor, in the manner previously described, and said arm is also preferably provided with a retracting spring, indicated at 300. The normal position of the valve is indicated in Figs. 10 and 11.

Assuming that the vehicles are in motion and the engine running, air will be exhausted through the pipes, 290 and 291, from the actuator on both sides of the piston leaving the piston submerged in vacuum. If the tractor brakes are applied by depressing the foot lever, 288, the trailer will naturally have a tendency to run up on the tractor and decrease the normal distance between them permitted by the coupling which will be of any usual or preferred construction, and which will provide a limited amount of lost motion, as previously described. As the trailer runs up and decreases the distance between the vehicles, the connection, 296, will be relieved and the retracting spring, 300, will spring the valve counter-clockwise (see Fig. 11) so as to disconnect the pipe, 291, from the suction pipe, 290—262, and connect it with the air inlet port, 293, thus applying the trailer brakes and retarding the trailer until it resumes its normal distance in rear of the tractor, and the same result will be produced if the trailer runs up on the tractor at any time, regardless of whether the tractor brakes are applied or not. As soon as the vehicles resume their normal relative positions, the valve, 294, will be restored to its normal position, reconnecting the pipe, 291, with the suction pipe, 290—262, permitting the instantaneous equalization of pressures on opposite faces of the piston, 203, instantly relieving the trailer brakes, the air admitted to operate said brakes being withdrawn through the suction pipe and delivered into the manifold under the control of the restricting valve, 262ª, so as not to interfere with the operation of the engine. If the trailer lags, the connecting device, 296, will cause the valve, 294, to swing in a clockwise direction and move it sufficiently to disconnect the pipe, 291, from the suction pipe, 290, but without admitting air in rear of the pistons, and will merely have the effect of preventing an accidental application of the brakes, there being no danger of the trailer skidding under these conditions so long as the trailer brakes are not applied.

It is obvious that our invention is not intended to interfere in any way with the normal backing of the vehicles, and where the rearward movement of the tractor would tend to cause the space between the vehicles to be reduced to such an extent as to operate the valve, 93 or 293, in a direction to apply the tractor brake, it will obviously be necessary to manually prevent this result. This can readily be done by manually moving the valve into the neutral position, for example by drawing the connecting link, 96 or 296, forward either from the driver's seat if the link is within reach of the driver or from the ground, so that the trailer brakes cannot be applied automatically during the normal backing of the vehicle. This result may also be accomplished in some instances where desired by closing off the valves, 90$^a$ and 91$^a$, shown in Fig. 2, so as to disconnect the actuator, P', for the trailer brakes during the backing of the vehicles.

We desire to have it understood that we do not limit ourselves to a rotary valve of the character shown and described, as other forms of valve mechanism may be employed which will accomplish the same result. It is obvious that where a Bowden wire and its protecting housing is employed as the connection between the valve operating arm and the tractor, it could be arranged to operate the valve in both directions, and in some instances the retracting spring might be dispensed with although we prefer to employ it, and it is illustrated herein.

What we claim and desire to secure by Letters Patent is:—

1. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder and a piston connected with the trailer brake mechanism, controlling valve mechanism, means for connecting the actuator cylinder on one side of the piston therein with the suction passage of the engine of the tractor and on the other side with the atmosphere, and means for automatically operating said valve mechanism by variations in the distance between said vehicles.

2. In brake mechanism for an automotive tractor vehicle provided with an internal combustion engine having a suction passage and brake mechanism for the tractor, and a trailer connected with and propelled by the tractor and provided with indepedently operable brake mechanism, the combination with a power actuator on the trailer comprising a cylinder and a piston connected with the trailer brake mechanism, controlling valve mechanism, means for connecting the actuator cylinder on one side of the piston therein with the suction passage of the engine of the tractor and on the other side with the atmosphere, and a connection from said valve mechanism to the tractor for automatically operating said valve mechanism by variations in the distance between said vehicles.

3. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder and a piston connected with the trailer brake mechanism, controlling valve mechanism, means for connecting the actuator cylinder on one side of the piston therein with the suction passage of the engine of the tractor and on the other side with the atmosphere, a retracting spring for moving said valve mechanism in one direction, and a connection between the valve mechanism and the tractor for moving the valve mechanism in the other direction to automatically operate the valve mechanism by variations in the distance between said vehicles.

4. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder and a piston connected with the trailer brake mechanism, controlling valve mechanism, tubular connections from the suction passage of the engine on the tractor to said valve mechanism and to the actuator cylinder forward of the piston, an air inlet for said valve mechanism, said valve mechanism being constructed to normally connect the actuator cylinder in rear of the piston with said suction passage to maintain the piston submerged in vacuum, and when moved in one direction to disconnect the said portion of said cylinder from the suction passage and connect it with the air inlet to effect the application of the trailer brakes automatically when the trailer overruns the tractor.

5. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder and a piston connected with the trailer brake mechanism, controlling valve mechanism, tubular connections from the suction passage of the engine on the tractor to said valve mechanism and to the actuator cylinder forward of the piston, an air inlet for said valve mechanism, said valve mechanism being constructed to normally connect the actuator cylinder in rear of the piston with said suction passage to maintain the piston submerged in vacuum, and when moved in one direction to disconnect the said portion of said cylinder from the suction passage and connect it with the air inlet to effect the application of the trailer brakes independently of the operation of the tractor brakes, and means including a connection between said valve mechanism and the tractor for automatically operating said valve mechanism, to apply and release the trailer brakes by variations in the distance between the tractor and trailer.

6. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder and a piston connected with the trailer brake mechanism, controlling valve mechanism, tubular connections from the suction passage of the engine on the tractor to said valve mechanism and to the actuator cylinder forward of the piston, an air inlet for said valve mechanism, said valve mechanism being constructed to normally connect the actuator cylinder in rear of the piston with said suction passage to maintain the piston submerged in vacuum, and when moved in one direction to disconnect the said portion of said cylinder from the suction passage and connect it with the air inlet to effect the application of the trailer brakes independently of the operation of the tractor brakes, the tractor and trailer being connected by a coupling permitting a limited amount of lost motion between the vehicles, and means including a connection from said valve mechanism to the tractor for operating said valve mechanism to apply and release the trailer brake mechanism by variations in the distance between the vehicles within the limits permitted by the lost motion in the coupling.

7. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, an operator operated part on the tractor connected with said valve mechanism, pipe connections extending between said actuators for enabling them to be jointly operated by the valve mechanism of the main actuator to substantially simultaneously apply the brake mechanisms of the tractor and trailer, of an auxiliary controlling valve mechanism constructed to normally maintain said actuators connected for joint operation and to disconnect said actuators and effect the operation of the auxiliary actuator independently of the main actuator to apply the trailer brakes in one position of the valve mechanism, and to disconnect said actuators to preclude the application of the trailer brakes or release them if applied in another position of said valve mechanism, and operative connections between said valve mechanism and the tractor for automatically operating the auxiliary valve mechanism by variations in the distance between the tractor and trailer.

8. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, an operator operated part on the tractor connected with said valve mechanism, tubular connections extending between said actuators for enabling them to be jointly operated by the valve mechanism of the main actuator to substantially simultaneously apply the brake mechanisms of the tractor and trailer, of an auxiliary controlling valve mechanism constructed to normally maintain said actuators connected for joint operation, and to disconnect said actuators and effect the operation of the auxiliary actuator independently of the main actuator to apply the trailer brakes in one position of the valve mechanism, and to disconnect said actuators to preclude the application of the trailer brakes or release them if applied in another position of said valve mechanism, operative connections between said valve mechanism and the tractor for automatically operating the auxiliary valve mechanism by variations in the distance between the tractor and trailer, and operative connections between said operator operated device and the brake mechanism of the tractor for permitting the operator to add his physical force to the tractor brake mechanism and to operate the same in case of failure of power.

9. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, said main actuator being provided with means for normally connecting the cylinder thereof on both sides of the piston with said suction passage when the piston is retracted to maintain the piston submerged in vacuum, an operator operated part connected with said valve mechanism, a tubular connection from the main actuator cylinder in rear of its piston to the corresponding portion of the auxiliary actuator cylinder, means for connecting the auxiliary actuator cylinder forward of its piston with said suction passage, whereby said auxiliary actuator piston is maintained normally submerged in vacuum when in retracted position, auxiliary valve mechanism on the tractor located in the tubular connection between said cylinders and normally maintaining them connected for joint operation, said valve mechanism having an inlet port connected with the atmosphere, and a suction port connected with said suction passage and being movable to disconnect said cylinders and connect the auxiliary actuator cylinder in rear of its piston with the said suction and inlet ports in different positions of the valve mechanism, and operative connections between said valve mechanism and the tractor for operating said valve mechanism by variations in the distance between said vehicles.

10. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, the cylinder of said main actuator being normally connected on both sides of the piston with said suction passage when the piston is retracted to maintain the piston submerged in vacuum, an operator operated part connected with said valve mechanism, a tubular connection from the main actuator cylinder in rear of its piston to the corresponding portion of the auxiliary actuator cylinder, means for connecting the auxiliary actuator cylinder forward of its piston with said suction passage, whereby said auxiliary actuator piston is maintained normally submerged in vacuum when in retracted position, auxiliary valve mechanism on the trailer located in the tubular connection between said cylinders and normally maintaining them connected for joint operation, said valve mechanism having an inlet port connected with the atmosphere, and connections between said valve mechanism and the tractor for effecting the movement of said valve mechanism to disconnect said actuator cylinders and connect the auxiliary actuator cylinder in rear of its piston with the atmosphere to apply the trailer brakes when the trailer runs up on the tractor.

11. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, the cylinder of said main actuator being normally connected on both sides of the piston with said suction passage when the piston is retracted to maintain the piston submerged in vacuum, an operator operated part connected with said valve mechanism, a tubular connection from the main actuator cylinder in rear of its piston to the corresponding portion of the auxiliary actuator cylinder, means for connecting the auxiliary actuator cylinder forward of its piston with said suction passage, whereby said auxiliary actuator piston is maintained normally submerged in vacuum when in retracted position, auxiliary valve mechanism on the tractor located in the tubular connection between said cylinders and normally maintaining them connected for joint operation, said valve mechanism having a suction port connected with the suction passage, and connections between said valve mechanism and the tractor for automatically effecting the operation of said valve mechanism to disconnect said actuator cylinders and connect the auxiliary actuator cylinder in rear of its piston with said suction port when the trailer lags and assumes a position at a greater than normal distance from the tractor, to release the trailer brake mechanism, if it has been applied and prevent the application thereof until the auxiliary valve is restored to normal position by the trailer resuming its normal position with respect to the tractor.

12. In brake mechanism for an automotive tractor vehicle provided with an internal combustion engine having a suction passage and brake mechanism for the vehicle, and a trailer connected with and propelled by the tractor and provided with independently operable brake mechanism, the combination with a main actuator on the tractor and an auxiliary actuator on the trailer comprising a cylinder and a piston connected with brake mechanism of the vehicle which carries it, main controlling valve mechanism for the main actuator, means for connecting the main actuator and the auxiliary actuator with said suction passage and with the atmosphere under the control of said main valve mechanism, including a tubular connection from the main actuator cylinder in rear of its piston and the auxiliary actuator in rear of its piston, an operator operated part on the tractor connected with the main valve mechanism, an auxiliary valve mechanism on the trailer located in said tubular connection and provided with means for connecting the auxiliary actuator with the suction passage and with the atmosphere, independently of said main valve mechanism, said auxiliary valve mechanism being constructed to normally maintain said actuators connected for joint operation and to disconnect said actuators and effect the operation of the auxiliary actuator independently of said main valve mechanism, and means including operative connections between said auxiliary valve mechanism and the tractor for automatically disconnecting said actuators and operating the auxiliary actuator to apply the trailer brakes by the running up of the trailer with respect to the tractor.

13. In brake mechanism for an automotive tractor vehicle provided with an internal combustion engine having a suction passage and brake mechanism for the vehicle, and a trailer connected with and propelled by the tractor and provided with independently operable brake mechanism, the combination with a main actuator on the tractor and an auxiliary actuator on the trailer comprising a cylinder and a piston connected with brake mechanism of the vehicle which carries it, main controlling valve mechanism for the main actuator, means for connecting the main actuator and the auxiliary actuator with said suction passage and with the atmosphere under the control of said main valve mechanism, including a tubular connection from the main actuator cylinder in rear of the piston and the auxiliary actuator in rear of its piston, an operator operated part on the tractor connected with the main valve mechanism, an auxiliary valve mechanism on the trailer located in said tubular connection and provided with means for connecting the auxiliary actuator with the suction passage and with the atmosphere independently of said main valve mechanism, said auxiliary mechanism being constructed to normally maintain said actuators connected for joint operation, and to disconnect said actuators, and to connect the auxiliary actuator cylinder in rear of the piston with said suction passage, and means including a connection between said valve mechanism and the tractor for automatically operating said auxiliary valve mechanism to disconnect said actuators and connect the auxiliary actuator in rear of its piston with said suction passage to release the trailer brakes if applied and prevent them from being applied under the control of said main valve mechanism.

14. In brake mechanism for a tractor vehicle provided with an internal combustion engine having a suction passage and brake mechanism for the tractor, and a trailer connected with the tractor by means providing limited lost motion, the combination with a main actuator on the tractor, comprising a cylinder and piston connected with the tractor brake mechanism, main controlling valve mechanism, means for connecting said cylinder on opposite sides of the piston with said suction passage, and with the atmosphere under the control of said valve mechanism, an operator operated part connected with the main valve mechanism, an auxiliary actuator on the trailer comprising a cylinder and a piston connected with the trailer brake mechanism, means for connecting said auxiliary actuator cylinder on opposite sides of its piston with said suction passage and with the atmosphere under the control of said main valve mechanism, including a pipe connecting the portions of said cylinders in rear of the pistons therein, of an auxiliary valve mechanism located in said pipe and provided with ports normally in communication, connecting said cylinders with an air inlet port, and a suction port connected with said suction passage, said valve mechanism being provided with means for disconnecting said cylinders and connecting the auxiliary actuator cylinder in rear of its piston with said inlet port in one position of the valve and for disconnecting said cylinder and connecting the auxiliary actuator cylinder in rear of its piston with said suction port in any position of the valve mechanism, and means including a connection between said valve mechanism and the tractor, operated by variations in the distance between said vehicles for operating said valve mechanism to disconnect said cylinders and apply the trailer brakes when the trailer runs up on the tractor, and to disconnect said cylinders and release the trailer brakes and prevent their application under the control of the main valve mechanism when the trailer lags and increases its distance from the tractor beyond the normal distance.

15. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder closed at both ends, and a piston therein, operatively connected with the trailer brake mechanism, tubular connections for connecting the said actuator cylinder on both sides of the piston therein with the suction passage of the engine on the tractor, and controlling valve mechanism located in certain of said tubular connections and provided with an air inlet port communicating with the atmosphere, said valve mechanism being constructed to normally maintain the portions of the actuator cylinder on opposite sides of the piston in communication with the suction passage of the engine and to disconnect the cylinder in rear of the piston from said suction passage and connect it with the air inlet port, while maintaining the connection between the cylinder forward of the piston and the suction passage to effect a power stroke of the piston to apply the trailer brakes without admitting appreciable quantities of air to the suction passage of the engine, and means for automatically operating said valve mechanism by variations in the distance between said vehicles.

16. In brake mechanism for an automotive tractor vehicle provided with an internal combustion engine having a suction passage and brake mechanism for the tractor, and a trailer connected with and propelled by the tractor and provided with independently operable brake mechanism, the combination with a power actuator on the trailer comprising a cylinder closed at both ends, and a piston therein, operatively connected with the trailer brake mechanism, tubular connections for connecting the said actuator cylinder on both sides of the piston therein with the suction passage of the engine on the tractor, and controlling valve mechanism located in certain of said tubular connections and provided with an air inlet port communicating with the atmosphere, said valve mechanism being constructed to normally maintain the portions of the actuator cylinder on opposite sides of the piston in communication with the suction passage of the engine and to disconnect the cylinder in rear of the piston from said suction passage and connect it with the air inlet port, while maintaining the connection between the cylinder forward of the piston and the suction passage to effect a power stroke of the piston to apply the trailer brakes without admitting appreciable quantities of air to the suction passage of the engine, means for automatically operating said valve mechanism by variations in the distance between said vehicles, and a check valve interposed between the actuator and the suction passage for normally maintaining rarification in the cylinder on opposite sides of the piston to permit the application of the trailer brakes regardless of degrees of rarification in the suction passage by the opening of the throttle valve or the stalling of the motor.

17. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor, comprising a cylinder and a piston connected with the brake mechanism thereof, an auxiliary actuator on the trailer comprising a cylinder and a piston connected with the trailer brake mechanism, controlling valve mechanism for the main actuator, means for connecting the main actuator cylinder with said suction passage and with the atmosphere under the control of said valve mechanism, the cylinder of said main actuator being normally connected on both sides of the piston with said suction passage when the piston is retracted to maintain the piston submerged in vacuum, an operator operated part connected with said valve mechanism, and connections between said operator operated part and the brake mechanism for the tractor containing provision for lost motion sufficient to insure the operation of the valve mechanism, a tubular connection from the main actuator cylinder in rear of its piston to the corresponding portion of the auxiliary actuator cylinder, means for connecting the auxiliary actuator cylinder forward of its piston with the suction passage, whereby the auxiliary actuator piston is maintained normally submerged in vacuum when the main actuator piston is in retracted position, auxiliary valve mechanism on one of said vehicles located in the tubular connection between said cylinder and normally maintaining them connected for joint operation, said valve mechanism having an inlet port connected with the atmosphere, and a suction port connected with said suction passage and being movable to disconnect said cylinders and connect the auxiliary actuator cylinder in rear of its piston with said suction and inlet ports respectively, in different positions of the valve mechanism, means including a connection between said valve mechanism and the other of said vehicles for operating said valve mechanism by variations in the distance between said vehicles, and a check valve interposed between said actuators and the suction passage of the engine whereby either or both of said actuator pistons may be operated to apply the brake mechanism connected therewith, without admitting appreciable quantities of air to said suction passage and regardless of decrease in the rarification in said suction passage due to the opening of the throttle valve or the stalling of the engine, and whereby the operator may apply his physical force to the brake mechanism of the tractor through the said operator operated part.

18. In brake mechanism for an automotive tractor vehicle provided with an internal combustion engine having a suction passage and brake mechanism for the tractor, and a trailer connected with and propelled by the tractor and provided with independently operable brake mechanism, the combination with an operator operated part on the brake, and connections from said operator operated part to the brake mechanism for the tractor, a power actuator on the trailer comprising a cylinder closed at both ends, a piston in said cylinder, and connections from said piston to the trailer brake mechanism, tubular connections for connecting the said actuator cylinder on both sides of the piston therein with the suction passage of the engine on the tractor, controlling valve mechanism for said actuator located on one of said vehicles, provided with ports communicating with said tubular connection, an air inlet port connected with the atmosphere, and a movable valve adapted to normally maintain the cylinder on both sides of the piston in communication with the suction passage, a check valve interposed between the actuator and said suction passage for normally maintaining rarification in the actuator cylinder on both sides of the piston, said controlling valve mechanism being constructed to connect the cylinder in rear of the piston with said inlet port, in one position of the valve, and means including a connection from said valve mechanism to the other of said vehicles for automatically operating said valve mechanism by variations in the distance between said vehicles, whereby said actuator will operate to apply the brake mechanism of the trailer regardless of a decrease in rarification in said suction passage due to the opening of the throttle valve or the stalling of the motor, and whereby the brakes of the tractor may be applied by the physical strength of the operator exerted upon the operator operated part.

In testimony whereof we affix our signatures.

CALEB S. BRAGG.
VICTOR W. KLIESRATH.